(12) United States Patent
Sawata et al.

(10) Patent No.: US 11,677,297 B2
(45) Date of Patent: Jun. 13, 2023

(54) ELECTRICAL MACHINES

(71) Applicant: Hamilton Sundstrand Corporation, Charlotte, NC (US)

(72) Inventors: Tadashi Sawata, Coventry (GB); Andrew E. Page, Tring (GB); Zeyuan Xu, Glasgow (GB); David Gerada, Beeston (GB); Dmitry Golovanov, Nottingham (GB); Christopher Gerada, Nottingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 153 days.

(21) Appl. No.: 17/151,370

(22) Filed: Jan. 18, 2021

(65) Prior Publication Data
US 2021/0226513 A1    Jul. 22, 2021

(30) Foreign Application Priority Data
Jan. 20, 2020 (EP) .................................. 20275011

(51) Int. Cl.
*H02K 9/22* (2006.01)
*H02K 1/14* (2006.01)
*H02K 5/20* (2006.01)

(52) U.S. Cl.
CPC ............. *H02K 9/227* (2021.01); *H02K 1/146* (2013.01); *H02K 5/203* (2021.01)

(58) Field of Classification Search
CPC .......... H02K 1/146; H02K 5/20; H02K 3/522; H02K 9/22; H02K 3/24; H02K 9/227; H02K 2213/03

USPC .......................................................... 310/64
See application file for complete search history.

(56) References Cited

U.S. PATENT DOCUMENTS

| | | | |
|---|---|---|---|
| 5,691,892 A * | 11/1997 | Meyer ................... | H01L 25/072 363/145 |
| 6,809,441 B2 | 10/2004 | Randall | |
| 8,487,500 B2 | 7/2013 | Cullen et al. | |
| 9,300,179 B2 * | 3/2016 | Sawata ................... | H02K 3/30 |
| 10,291,086 B2 * | 5/2019 | Deàk ...................... | H02K 1/182 |
| 10,587,163 B2 * | 3/2020 | Crosby ................. | H02K 1/146 |
| 2008/0197724 A1 | 8/2008 | Cullen et al. | |
| 2009/0146513 A1 | 6/2009 | Bremner | |

(Continued)

FOREIGN PATENT DOCUMENTS

| JP | H09182342 A | 7/1997 |
|---|---|---|
| JP | 2006087172 A | 3/2006 |

OTHER PUBLICATIONS

Extended European Search Report for International Application No. 20275011.3 dated Jul. 15, 2020, 8 pages.

*Primary Examiner* — Alex W Mok
(74) *Attorney, Agent, or Firm* — Cantor Colburn LLP

(57) ABSTRACT

A stator assembly for an electrical machine comprises a stator, a plurality of inserts and a heat sink. The stator comprises an annular core extending around an axis (X) and a plurality of axially extending slots. A plurality of sets of electrical windings is arranged within the slots. The windings have axial end portions arranged at axial ends of the core. The inserts comprise ceramic plates which are arranged in respective slots in the gaps (G) between adjacent respective electrical windings in the slots. The inserts extend axially from the respective slots for engagement with the heat sink.

16 Claims, 4 Drawing Sheets

(56) References Cited

U.S. PATENT DOCUMENTS

2018/0115222 A1 4/2018 Lassila
2020/0021163 A1 1/2020 Lhotellier et al.

* cited by examiner

ELECTRICAL MACHINES

FOREIGN PRIORITY

This application claims priority to European Patent Application No. 20275011.3 filed Jan. 20, 2020, the entire contents of which is incorporated herein by reference.

TECHNICAL FIELD

The present disclosure relates to electrical machines such as motors and generators and in particular to cooling such machines.

BACKGROUND

Electrical machines such as motors and generators generate heat during operation. As machine sizes increase, the heat generated in the machine increases, meaning that in many machines it is necessary to cool the machine to prevent overheating and also to maintain performance.

In high performance electrical machines, cooling of windings is one of the key factors to achieve high power densities as the operating temperature is normally limited by temperature rating of insulation materials (e.g. enamel) of wire. While end-windings can be cooled relatively easily by means of heat sinks and/or air cooling, extracting heat from windings in stator slots provides challenges.

Slot liners are commonly used for additional electrical insulation between windings and stator core. Similarly, coil separators are used for electrical insulation of adjacent windings. However, slot liners often reduce thermal conduction between windings and the stator core resulting in higher operating temperatures of windings. In some electrical machines, Litz wire, which consists of individually insulated multiple strands of small conductors, is used to minimize AC losses. It is a common practice to have an overall wrapping around Litz wire for additional electrical insulation between adjacent windings as well as between turns. The overall wrapping will also reduce thermal conductivity between windings and stator core increasing winding operating temperature. There is a need to extract heat from windings in stator slots without compromising on electrical insulation requirements.

SUMMARY

According to a first aspect of this disclosure, there is provided a stator assembly for an electrical machine. The stator assembly comprises a stator, a plurality of inserts and a heat sink. The stator comprises an annular core which extends around an axis and comprises a plurality of axially extending slots. A plurality of sets of electrical windings is arranged within the slots. The windings have axial end portions arranged at axial ends of the core. The inserts comprise ceramic plates which are arranged in respective slots in the gaps between adjacent respective electrical windings in the slots and which extend axially from the respective slots for engagement with the heat sink.

In an embodiment of the above, the heat sink comprises at least one cooling plate arranged axially adjacent to the windings and axially abutting the at least one insert.

In a further embodiment of any of the above, the heat sink comprises a portion of a housing of the stator.

In a further embodiment of any of the above, the inserts are solid pieces that do not include passages.

In a further embodiment of any of the above, the inserts are solid pieces that do not include cavities.

In a further embodiment of any of the above, the ceramic plates have parallel axially facing surfaces.

In a further embodiment of any of the above, each insert is formed as a generally T-shaped ceramic element. The central leg of the T-shape element forms a said plate arranged between the windings in the slot. The arms of the T-shaped element extend at least partially over the axial end portions of the windings.

In a further embodiment of any of the above, the T-shaped ceramic element comprises fillets between the central leg and the arms thereof. The fillets are shaped to generally match the shape of the outer surface of the axial end portions of the adjacent stator windings.

In a further embodiment of any of the above, the arms of the T-shaped element do not extend circumferentially over the entire axial ends of the windings, such that an axially outward facing surface of the arms lies generally flush with the axial facing end surface of the windings.

In a further embodiment of any of the above, the axially facing surface of the arms of the T-shaped element are generally flat.

In a further embodiment of any of the above, the T-shaped element comprises two L-shaped elements placed back to back.

In a further embodiment of any of the above, the stator assembly comprises respective ceramic inserts extending into respective axial ends of the respective axial slots.

In a further embodiment of any of the above, the respective ceramic inserts each extend approximately half of the total axial length of the slots.

In a further embodiment of any of the above, the inserts are formed from Aluminium-Nitride, Silicon Nitride or Boron Nitride.

In a further embodiment of any of the above, the inserts are received with a press fit in the gap.

In a further embodiment of any of the above, the inserts are retained in the gap using a potting compound.

According to a further aspect of the disclosure, there is provided a ceramic insert for inserting between windings of a stator. The ceramic insert is a generally T-shaped element. A central leg of the T-shape element is configured as a plate to be arranged between windings of a stator. The arms of the T-shaped element are configured to extend at least partially over axial end portions of the windings.

In an embodiment of the above, the T-shaped ceramic element comprises fillets between the central leg and the arms thereof.

According to a further aspect of the disclosure, there is provided a method of assembling a stator assembly for an electrical machine, the stator assembly comprising an annular core extending around an axis and comprising a plurality of axially extending slots, and a plurality of electrical windings arranged in the slots and having end portions at axial ends of the core. The method comprises inserting ceramic plates of a plurality of ceramic inserts into respective slots between consecutive sets of the windings and placing the ceramic inserts in thermal communication with a heat sink.

In an embodiment of the above, the heat sink comprises an annular cooling plate and the method further comprises mounting the cooling plate at an axial facing surface end of the ceramic inserts after mounting the at least one insert between the windings, such that the annular cooling plate is in thermal contact with axially facing surfaces of the end portions of the electrical windings.

In a further embodiment of any of the above, the annular cooling plate is in thermal contact with an axially facing surface of the at least one insert.

BRIEF DESCRIPTION OF DRAWINGS

The following descriptions should not be considered limiting in any way. With reference to the accompanying drawings, like elements are numbered alike.

DETAILED DESCRIPTION

Figure 1:
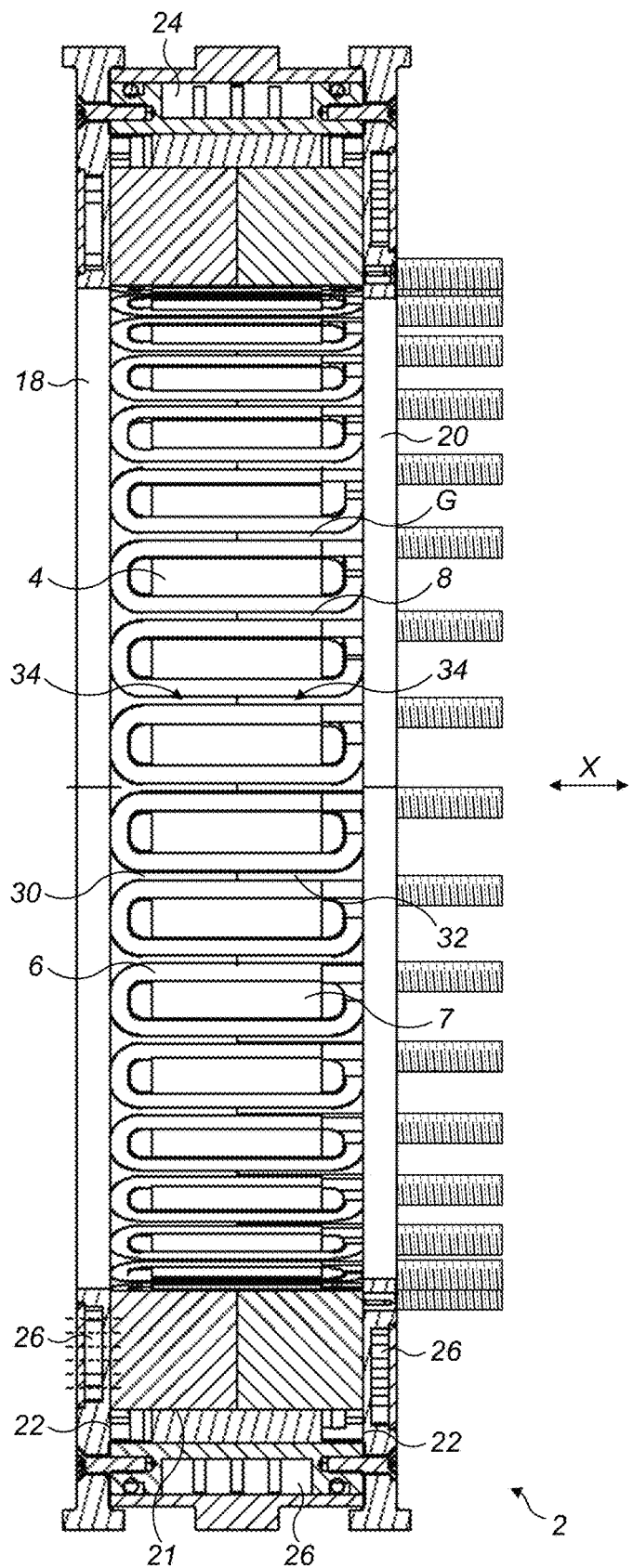
FIG. 1 shows a partially sectioned view of a stator assembly for an electrical machine in accordance with the disclosure.

FIG. 1 illustrates a portion of a stator assembly 1 for an electrical machine. The electrical machine may be an electric motor and a stator 2 of the stator assembly 1 may be configured to extend substantially around a rotor of the motor. The principles of this disclosure may be applied to other electrical machines however, for example to electrical generators.

Figure 2:
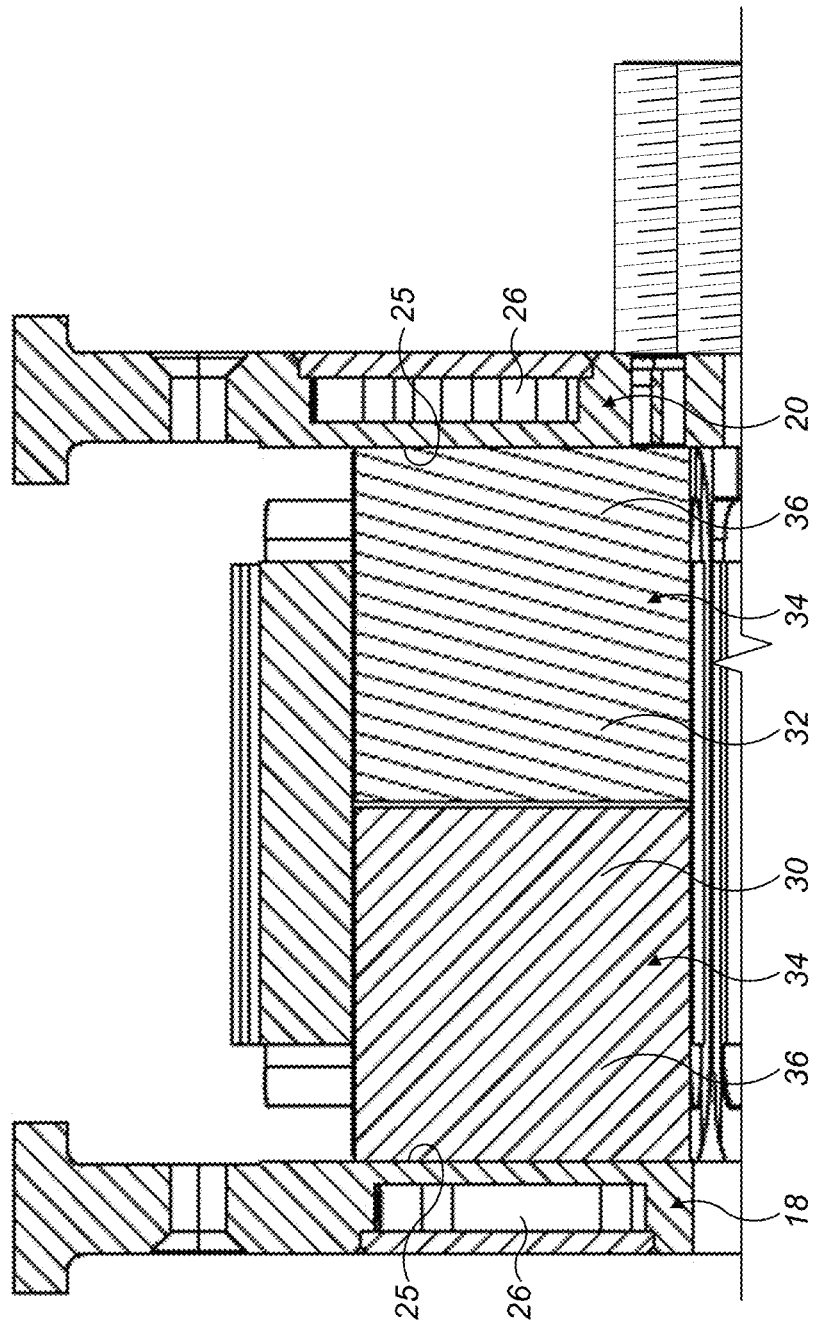
FIG. 2 shows a more detailed cross sectional view of the stator assembly.

Referring to FIGS. 1 and 2, the stator 2 is generally annular in shape and comprises an annular core 4 with a plurality of axially extending slots 8 spaced circumferentially around the core 4. The stator 2 also comprises sets of stator windings 6. Each winding set 6 comprises bundles of electrical wires that encircle respective teeth 7 of the annular core 4 defined between the axial slots 8, such that each winding set 6 is arranged in two circumferentially consecutive slots 8. Each tooth 7 of the annular core 4 has a winding set 6 encircling it at least once such that each slot 8 has portions of two adjacent winding sets 6 arranged in it. The winding sets 6 each have a generally 'racetrack' shape, with curved portions 10 joining elongate portions 16 located in the slots 8 with axial facing end surfaces 12 of the windings 6. For the purpose of this disclosure, the curved portions 10 and the axial facing end surface winding portions 12 will be together considered axial end portions 14 of the windings 6.

The adjacent winding sets 6 in the slots 8 are circumferential spaced from one another such that there is an axially extending gap G between the adjacent winding sets 6. Typically this gap may be 1.0 to 5 mm in width, for example 1.5 to 4 mm in width. In this embodiment the slots 8 extend parallel to a central axis X of the stator assembly 1 but in other embodiments, they may be angled relative thereto.

The stator 2 also comprises at least one heat sink 18, 20. In this embodiment, the heat sinks comprise first and second annular cooling plates 18, 20 which are arranged at opposed axial ends 22 of the core 4. A generally annular cooing jacket 24 is also located against and around a radially outer surface 21 of the core 4. The cooling jacket 24 and first and second cooling plates 18, 20 each comprise at least one cooling passage 26 which can allow cooling fluid to flow therethrough. The first and second cooling plates 18, 20 each have a generally flat axial facing surface 25 which can provide cooling to the axial portions 14 of the windings 6 as will be discussed further below. The cooling jacket 24 provides cooling to the radially outer surface 28 of the core 4.

It will be appreciated that in alternative embodiments of the disclosure, the first and second cooling plates 18, 20 may alternatively be solid structures without the cooling passages 26.

The core 4 may also be surrounded at least partially by a stator housing (not shown) which may surround a radially outer and/or axial surface of the core 4. The housing may be formed from one-piece or may be constructed from multiple pieces and in alternative embodiments may also act as a heat sink instead of or as well as the above described cooling plates/jacket.

Figure 3:
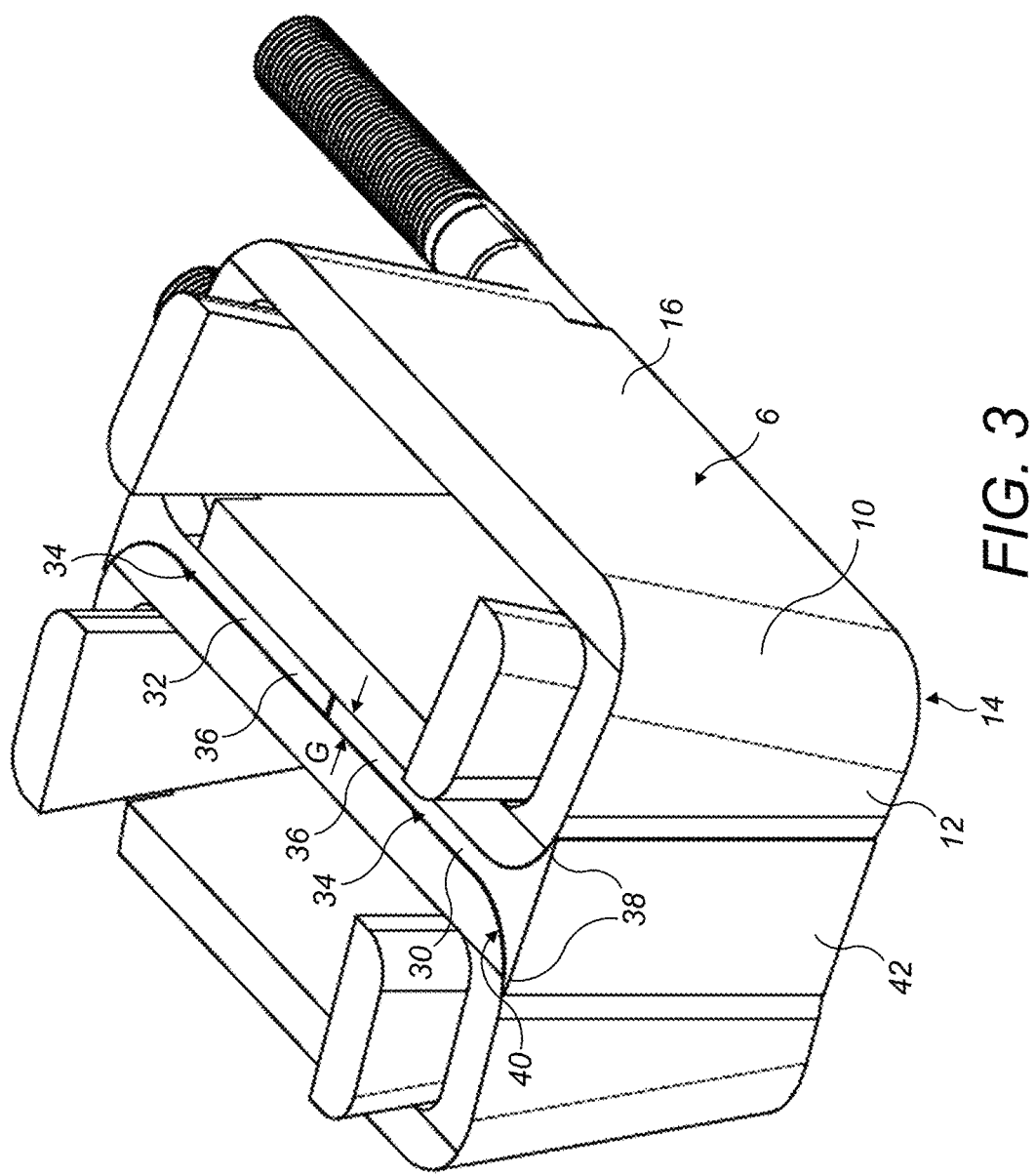
FIG. 3 shows a detail of the stator assembly.

Referring to FIGS. 1 to 3, inserts 34 comprise ceramic plates 30, 32 which are located in the gaps G between the adjacent winding sets 6. The inserts 34 in this embodiment are formed as solid pieces of ceramic material which do not include any passages and/or cavities therethrough. The plates 30,32 located within the slots 8 may have a substantially constant thickness T (defined in a circumferential direction) that allows the plates to fit in the gap G but also allows circumferential facing surfaces of the plates 30,32 to engage both of the elongate winding portions 16 located in the slots 8. Alternatively, the thickness T of the plates 30, 32 in the slot 8 may be tapered radially such that the thickness increases as the plates 30, 32 extend radially outward.

Figure 4:
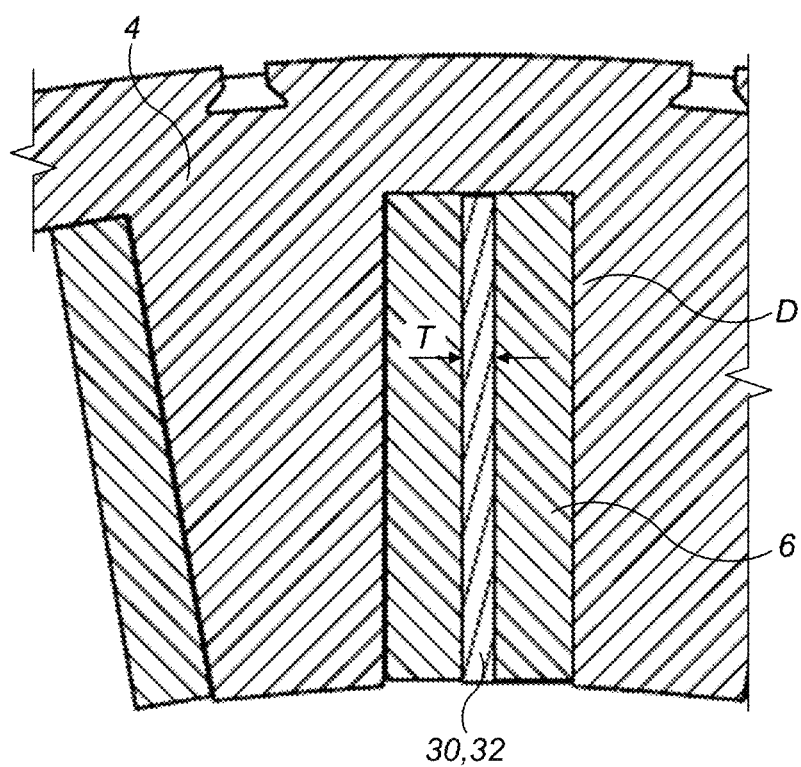
FIG. 4 shows a cross section through a portion of the stator assembly

As illustrated in FIG. 4, which shows a vertical circumferential cross-section of the stator assembly, the plates 30, 32 may also have a radial depth D that is substantially equal to, or greater than the radial span of the winding sets 6 within the slots 6. This will maximise contact between the plates 30, 32 and the windings 6 to maximise heat transfer therebetween.

The plates 30, 32 may be a press fit within the slots 8 so as to ensure close contact with the windings 6.

For the purpose of this disclosure, a plate may be regarded as a relatively thin element, for example defined by a maximum thickness to width ratio of 1:2.5, for example 1:5, for example 1:10, or greater. That is the thickness of the portions of the plates 30,32 described herein extending into the slots 8 have a radial depth D to thickness T ratio of at least 2.5:1, for example 5:1, for example 10:1 or greater. The particular value will be chosen to meet the particular application. The thickness T may typically be between 1 mm and 5 mm. The width of the plates 30, 32 will be determined by the size of the stator 2, but may be up to 100 mm for example.

In some embodiments (not illustrated), the ceramic plates 30,32 located in the slots 8 may have radially inner and/or outer flanges that are shaped to match the radially inner and/or outer portions of the windings 6, such that the plates 30,32 wrap around the radially inner and/or outer portions of the windings 6.

The inserts 34 may be formed from any suitable ceramic, for example Aluminium-Nitride, Boron Nitride, or Silicon Nitride. What is important is that the material provides high thermal conductivity and low electric conductivity. Ceramics typically provide thermal conductivity values above 75 WmK—higher than other insulating materials, for example plastics, that are typically used.

In this embodiment, as illustrated in FIG. 3, each insert 34 is formed as a generally T-shaped element. The central leg 36 of each insert 34 is generally planar and constitutes a respective plate 30, 32 arranged in the slot 8 between the consecutive windings 6. The arms 38 of the insert 34 extend partially over the winding axial end portions 14.

Between the arms 38 and the leg 36 of each insert 34 in this embodiment are fillets 40. The fillets 40 are curved to generally match the shape of the curved portions 10 the windings 6. Thus, advantageously the fillets 40 may contact the curved portions 10 of the windings 6, thereby providing effective cooling to the curved portions 10 in addition to the central leg 36 providing cooling to the elongate winding portions 16.

In the illustrated embodiment, the arms 38 of each T-shaped insert 34 only extend partially around the axial end portions 14 of the windings 6, and may only extend around the curved portions 10 of the windings 6. As illustrated, an axial facing surface 42 of each T-shaped insert 34 may be formed to be generally flat and lie substantially flush with the axial facing end surfaces 12 of the windings 6 either side of the windings. The axial end surfaces 12 of the windings 6 and of the T-shaped inserts 34 can therefore together form an axial facing surface which can abut the first or second cooling plates 18, 20.

Alternatively, in other embodiments, the arms 38 of the T-shaped inserts 34 may extend across half of the of the axial ends portions 14 of the windings 6 in a circumferential direction, such that when T-shaped inserts 34 are placed in adjacent slots 8, the arms 38 of the adjacent inserts 34 cover the whole of the axial end portions 14 of the windings 6 and axial facing generally flat surfaces of the T-shaped inserts 34 can therefore together to form an axially facing surface. This axially facing surface can abut the first or second cooling plates 18, 20. Whilst effective, this illustration may unnecessarily obstruct heat transfer from the end of the windings 6.

As shown in FIG. 3, two T-shaped inserts 34 may be located in each slot 8, with a first insert 34 extending from a first axial end of the slot 8, and a second insert 34 extending from a second opposite axial end of the same slot 8. The first insert 34 abuts the first cooling plate 18 and the second insert 34 abuts the second cooling plate 20.

The central legs 36 of the first and second T-shaped inserts 34 can extend axially approximately half of the total axial length of the slot 8. This ensures that heat is absorbed by the inserts 34 throughout substantially the whole axial length of the slots 8, so that hot spots are less likely to form within the slot 8.

The inserts 34 may be formed as unitary elements, as shown. In an alternative arrangement, however, they may by formed by two L-shaped ceramic plate elements placed back to back with longer legs of the L-shaped elements adjacent each other in the gap G between the windings 6 in the slot 8, and the shorter legs of the L-shaped elements extending over the axial end portions 14 of the respective sets of windings 6.

All of the above described inserts 34 absorb heat from the elongate portions 16 of the windings 6. Ceramics have a relatively high thermal conductivity, and therefore the inserts 34 will heat up as the windings 6 heat up, thus absorbing some of the heat from the elongate portions 16 of the windings 6. The inserts 34 can then transfer this heat axially to the first and/or second cooling plates 18, 20. The ceramic material also provides electrical insulation needed in the gap G between the winding sets 6. Since the ceramic inserts 34 can act as an electrical insulator, this can eliminate the necessity of coil separators between adjacent windings 6. In the same way, overall wrapping of Litz wire may be eliminated. This may reduce the complexity and cost of the stator assembly.

Additionally, the axial facing surfaces 42 of the inserts 34 provide a relatively large surface area for transferring heat between the inserts 34 and the first and second heat sinks 18,20, therefore providing more effective heat transfer from the windings 6 to the heat sinks 18,20.

A method of assembling the stator assembly 1 will now be described.

As a first step, the core 4 may be assembled into the cooling jacket 24. The core 4 may be advantageously wound with its windings 6 prior to assembly into the cooling jacket 24. In alternative embodiments, the core 4 may be assembled into the cooling jacket 24 at a later stage of the assembly for example after the inserts 34 and first and second cooling plates 18,20 have been installed.

The inserts 34 may then be placed into the slots 8, from both axial sides of the core 4. Slotting different inserts 34 via each axial end results in ease of maintenance compared with installing one insert 34, and the at least two inserts 34 can move relative to one another when installed thus reducing stresses in the inserts 34. The inserts 34 may be received in the slots 8 with a press fit.

Potting compounds may be applied to the apparatus at this stage in any gaps G around the inserts 34 to improve thermal transfer and mechanical robustness of the final stator 2. The potting compound may also retain or help to retain the inserts 34 in the slots 8.

The first and second cooling plates 18, 20 are then assembled against the axial facing surfaces 42 of the inserts 34. The first and second cooling plates 18, 20 may be pressed against the axial facing surfaces 42 to fully locate the inserts 34 between the windings 6 and to ensure that the axial facing surface of the first and second cooling plates 18, 20 are in contact with both the windings axial facing surfaces 12 and the axial facing surfaces 42 of the inserts 34 to ensure good thermal contact therebetween.

The first and second cooling plates 18, 20 may be secured to the cooling jacket 24 by suitable fasteners. The skilled person will recognise that the first and second cooling plates 18,20 can be fastened in place via alternative means for example they may be attached to a housing of the stator 2 or the core 4, and may be secured via means other than fasteners for example an adhesive.

Advantageously, the T-shaped insert elements 34 do not require retaining features to stay in place, as may have been required for conventional cooling insert designs, being retained frictionally in the gaps G and by the cooling plates 18, 20.

It will be appreciated that the above description is of a non-limiting embodiment only and that various modifications may be made thereto without departing from the scope of the disclosure.

For example, the skilled person will appreciate that in alternative embodiments, the inserts 34 may instead be provided by simple flat plates without being T-shaped.

Furthermore, the skilled person will appreciate that a plurality of inserts may be joined together in some manner rather than each being a single element.

The invention claimed is:

1. A stator assembly for an electrical machine comprising a stator, a plurality of inserts and a heat sink, wherein the stator comprises:
   an annular core extending around an axis (X) and comprising a plurality of axially extending slots; and
   a plurality of sets of electrical windings arranged within the slots and having axial end portions arranged at axial ends of the core;
   wherein the inserts comprise ceramic plates which are arranged in respective slots in the gaps (G) between adjacent respective electrical windings in the slots, wherein the inserts extend axially from the respective slots for engagement with the heat sink;
   wherein the heat sink comprises at least one cooling plate arranged axially adjacent to the windings, a flat axially facing surface of the at least one cooling plate axially abutting at least one axially facing surface of the inserts, the at least one cooling plate being a separate component to the inserts.

2. The stator assembly of claim 1, wherein the heat sink comprises a portion of a housing of the stator.

3. The stator assembly of claim 1, wherein the inserts are solid pieces that do not include passages or cavities.

4. The stator assembly of claim 1, wherein the ceramic plates have parallel axially facing surfaces.

5. The stator assembly of claim 1, wherein each insert is formed as a generally T-shaped ceramic element, the central leg of the T-shape element forming a said plate arranged between the windings in the slot and the arms of the T-shaped element extending at least partially over the axial end portions of the windings.

6. The stator assembly of claim 5, wherein the T-shaped element comprises two L-shaped elements placed back to back.

7. The stator assembly of claim 1, wherein the T-shaped ceramic element comprises fillets between the central leg and the arms thereof, the fillets being shaped to generally match the shape of the outer surface of the axial end portions of the adjacent stator windings.

8. The stator assembly of claim 1, comprising respective ceramic inserts extending into respective axial ends of the respective axial slots.

9. The stator assembly of claim 8, wherein the respective ceramic inserts each extend approximately half of the total axial length of the slots.

10. The stator assembly of claim 1, wherein the inserts are formed from Aluminium-Nitride, Silicon Nitride or Boron Nitride.

11. The stator assembly of claim 1, wherein the inserts are received with a press fit in the gap (G), or the inserts are retained in the gap (G) using a potting compound.

12. The stator assembly of claim 1, wherein the at least one flat axial facing surface of the at least one cooling plate provides cooling to the axial end portions of the electrical windings.

13. The stator assembly of claim 1, further comprising an annular cooling jacket located against and around a radially outer surface of the annular core.

14. A method of assembling a stator assembly for an electrical machine, the stator assembly comprising an annular core extending around an axis (X) and comprising a plurality of axially extending slots, and a plurality of electrical windings arranged in the slots and having end portions at axial ends of the core, the method comprising:

inserting ceramic plates of a plurality of ceramic inserts into respective slots between consecutive sets of the windings and placing the ceramic inserts in thermal communication with a heat sink;

wherein the heat sink comprises an annular cooling plate, the method further comprising mounting the cooling plate at least one axially facing surface of the ceramic inserts after mounting the ceramic inserts between the windings, such that a flat axially facing surface of the annular cooling plate is in thermal contact with the at least one axially facing surface of the ceramic inserts.

15. A stator assembly for an electrical machine comprising a stator, a plurality of inserts and a heat sink, wherein the stator comprises:

an annular core extending around an axis (X) and comprising a plurality of axially extending slots; and a plurality of sets of electrical windings arranged within the slots and having axial end portions arranged at axial ends of the core;

wherein the inserts comprise ceramic plates which are arranged in respective slots in the gaps (G) between adjacent respective electrical windings in the slots, wherein the inserts extend axially from the respective slots for engagement with the heat sink;

wherein each insert is formed as a generally T-shaped ceramic element, the central leg of the T-shape element forming a said plate arranged between the windings in the slot and the arms of the T-shaped element extending at least partially over the axial end portions of the windings; and wherein the arms of the T-shaped element do not extend circumferentially over the entire axial ends of the windings, such that an axially outward facing surface of the arms lies generally flush with the axial facing end surface of the windings.

16. The stator assembly of claim 15, wherein the axially facing surfaces of the arms of the T-shaped element are generally flat.

* * * * *